United States Patent
Bragstad et al.

(10) Patent No.: US 9,525,715 B2
(45) Date of Patent: *Dec. 20, 2016

(54) DEPLOYING A PORTION OF A STREAMING APPLICATION TO ONE OR MORE VIRTUAL MACHINES

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,281

(22) Filed: Feb. 16, 2016

(65) Prior Publication Data

US 2016/0164944 A1 Jun. 9, 2016

Related U.S. Application Data

(63) Continuation of application No. 14/227,579, filed on Mar. 27, 2014, now Pat. No. 9,325,766.

(51) Int. Cl.
*H04L 29/06* (2006.01)
*H04L 29/08* (2006.01)
(Continued)

(52) U.S. Cl.
CPC ............ *H04L 65/80* (2013.01); *G06F 9/45558* (2013.01); *G06F 17/30516* (2013.01);
(Continued)

(58) Field of Classification Search
CPC .......................... G06F 17/30516; H04L 65/60
See application file for complete search history.

(56) References Cited

U.S. PATENT DOCUMENTS 8,112,541 B2  2/2012  Amini et al.
8,407,360 B2  3/2013  Andrade et al.
(Continued)

OTHER PUBLICATIONS

Zinn et al., Streaming Satellite Data to Could Workflows for On-Demand Computing of Environmental Products, Workflows in Support of Large-Scale Science (WORKS), 2010, 5th Workshop, pp. 1-7.

(Continued)

*Primary Examiner* — Lashonda Jacobs
(74) *Attorney, Agent, or Firm* — Martin & Associates, LLC; Derek P. Martin

(57) ABSTRACT

A streams manager monitors performance of a streaming application, and when the performance needs to be improved, the streams manager determines from split rules how to split the flow graph for the streaming application. The streams manager requests virtual machines from a cloud manager. In response, the cloud manager provisions one or more virtual machines in a cloud. The streams manager then modifies the flow graph so a portion of the flow graph is deployed to the one or more virtual machines in the cloud. In this manner a streaming application can dynamically evolve to increase its performance as needed.

17 Claims, 9 Drawing Sheets

(51) Int. Cl.
  *G06F 17/30* (2006.01)
  *H04L 12/24* (2006.01)
  *H04L 12/26* (2006.01)
  *G06F 9/455* (2006.01)

(52) U.S. Cl.
  CPC ...... *H04L 41/0806* (2013.01); *H04L 43/0876* (2013.01); *H04L 65/4069* (2013.01); *H04L 65/60* (2013.01); *H04L 67/10* (2013.01); *G06F 2009/4557* (2013.01)

(56) References Cited

U.S. PATENT DOCUMENTS

| | | |
|---|---|---|
| 2008/0188987 A1 | 8/2008 | Gu et al. |
| 2010/0106946 A1* | 4/2010 | Imaki ................ G06F 17/30516 712/220 |
| 2010/0293532 A1* | 11/2010 | Andrade ............. G06F 11/1438 717/140 |
| 2010/0293535 A1 | 11/2010 | Andrade et al. |
| 2011/0040827 A1 | 2/2011 | Katsunuma et al. |
| 2011/0083046 A1* | 4/2011 | Andrade ............. G06F 11/0793 714/47.1 |
| 2013/0080652 A1 | 3/2013 | Cradick et al. |
| 2013/0166948 A1* | 6/2013 | Branson ............. G06F 11/3433 714/15 |
| 2013/0173587 A1 | 7/2013 | Imaki et al. |
| 2015/0128135 A1* | 5/2015 | Cao ................... G06F 17/30958 718/1 |
| 2015/0358425 A1* | 12/2015 | Vennelakanti ........... G01V 1/28 709/226 |

OTHER PUBLICATIONS

JP2007164504A, Stream Data Processing Method and Stream Data Processor, Abstract, Jun. 28, 2007.
JP2010108152A, Stream Data Processing Method and System Therefor, Abstract, May 13, 2010.
Pietzuch et al., "Network-Aware Operator Placement for Stream-Processing Systems," Division of Engineering and Applied Science, Harvard University, 2006.
Cherniack et al., "Scalable Distributed Stream Processing," Proceedings of the 2003 CIDR Conference.

* cited by examiner

| Operator | Function | Split Rules | |
|---|---|---|---|
| A | Split according to f(x) | Keep Split Operator and Receiving Operators together | 1010 |
| B | Apply variance to input and output | Keep Split Operator and Receiving Operators Together | 1020 |
| C | Apply variance to input and output | Keep Split Operator and Receiving Operators Together | 1030 |
| D | Apply g(x) and output | Host Separately from Input Operator | 1040 |

DEPLOYING A PORTION OF A STREAMING APPLICATION TO ONE OR MORE VIRTUAL MACHINES

CROSS-REFERENCE TO RELATED APPLICATION

This application is a continuation of U.S. Ser. No. 14/227,579 filed on Mar. 27, 2014, which issued as U.S. Pat. No. 9,325,766 on Apr. 26, 2016.

BACKGROUND

1. Technical Field

This disclosure generally relates to streaming applications, and more specifically relates to enhancing performance of a streaming application by deploying a portion of the streaming application to one or more virtual machines.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

A streams manager monitors performance of a streaming application, and when the performance needs to be improved, the streams manager determines from split rules how to split the flow graph for the streaming application. The streams manager requests virtual machines from a cloud manager. In response, the cloud manager provisions one or more virtual machines in a cloud. The streams manager then modifies the flow graph so a portion of the flow graph is deployed to the one or more virtual machines in the cloud. In this manner a streaming application can dynamically evolve to increase its performance as needed.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
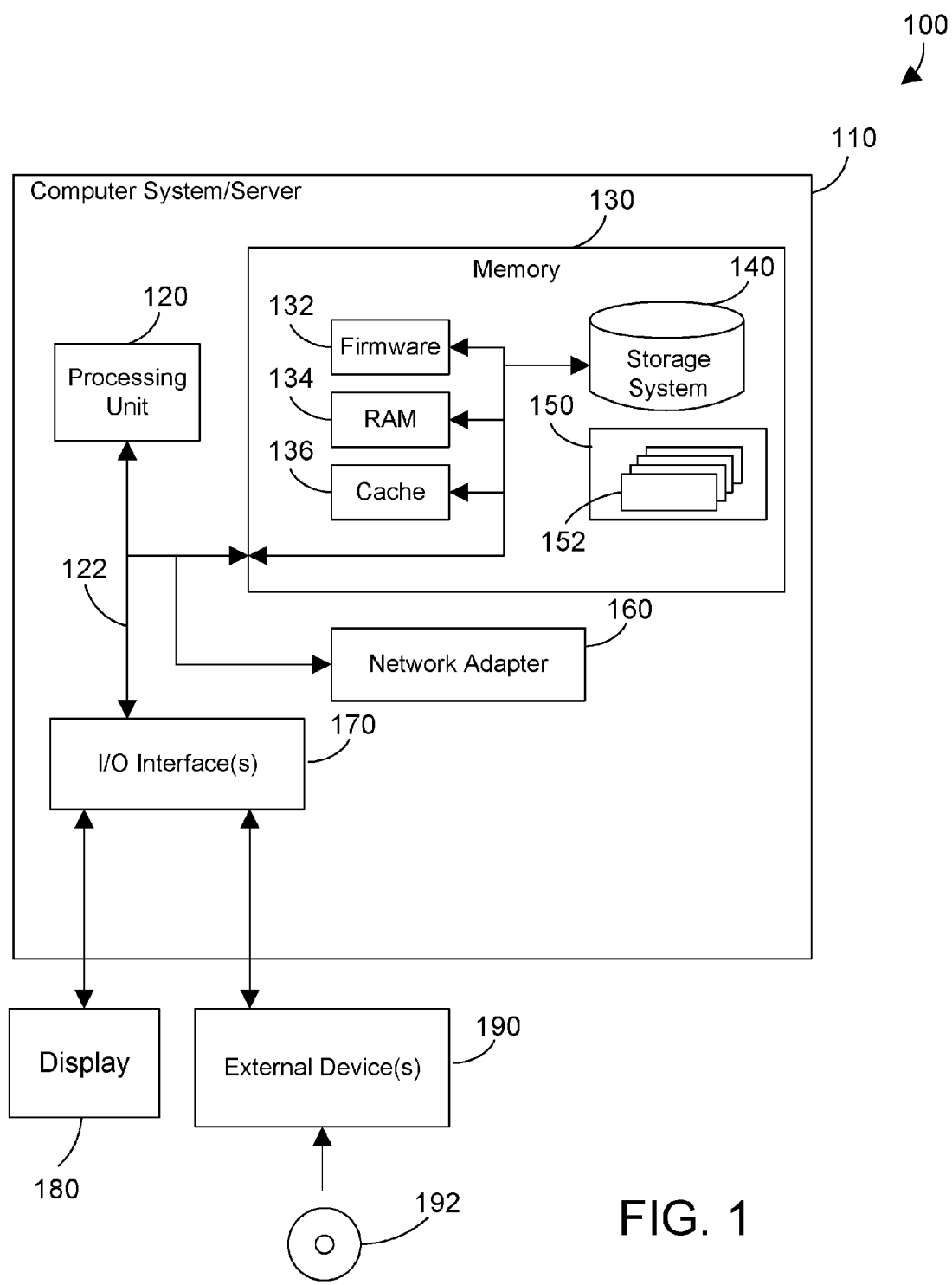
FIG. 1 is a block diagram of a cloud computing node.

A streams manager monitors performance of a streaming application, and when the performance needs to be improved, the streams manager determines from split rules how to split the flow graph for the streaming application. The streams manager requests virtual machines from a cloud manager. In response, the cloud manager provisions one or more virtual machines in a cloud. The streams manager then modifies the flow graph so a portion of the flow graph is deployed to the one or more virtual machines in the cloud. In this manner a streaming application can dynamically evolve to increase its performance as needed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
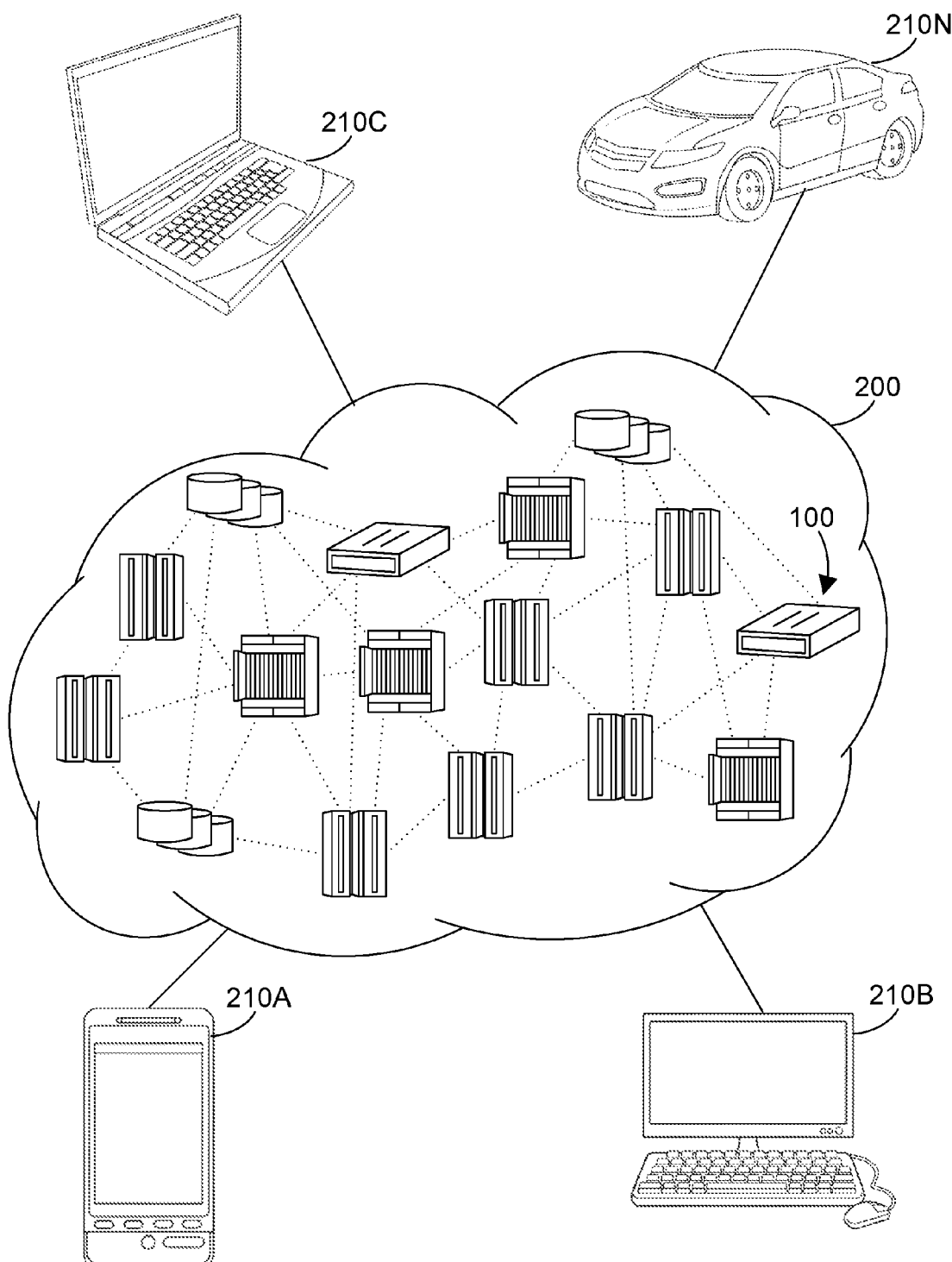
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
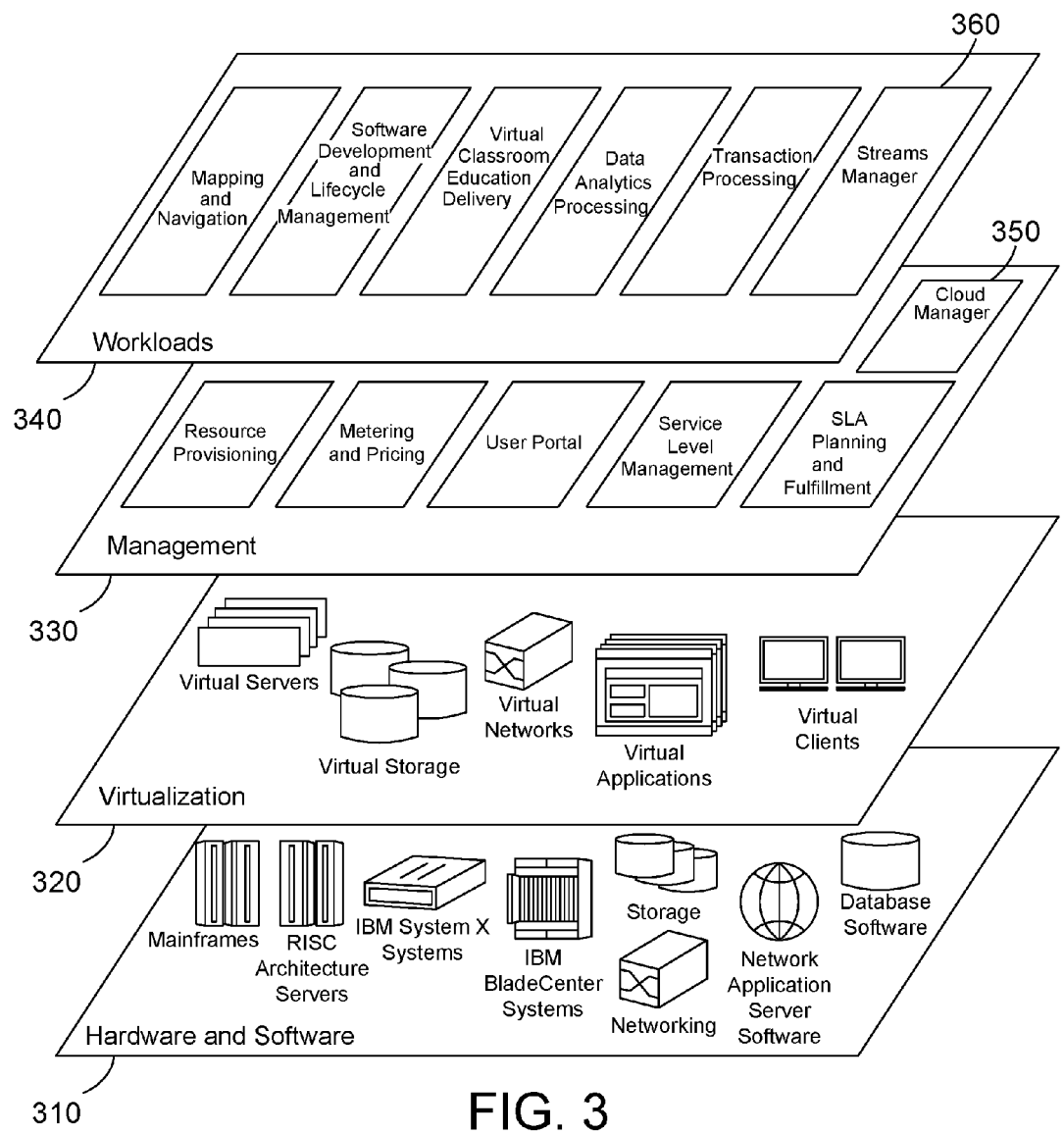
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing;

transaction processing; and a streams manager 360, as discussed in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
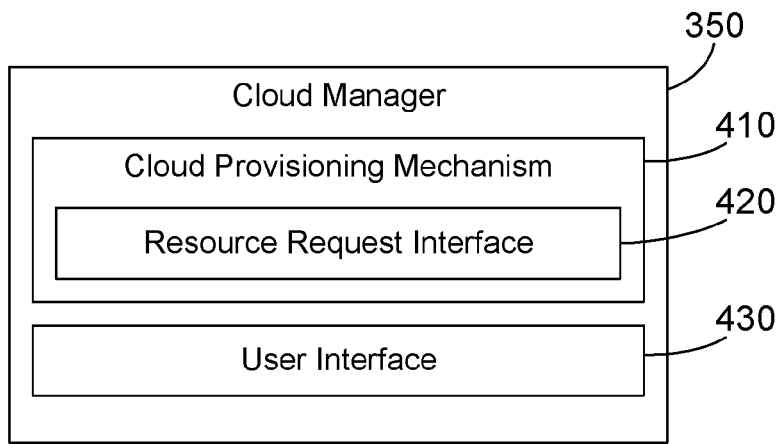
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request virtual machines from the cloud manager 350 without human intervention. The cloud manager 350 also includes a user interface 430 that allows a user to interact with the cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user. Of course, cloud manager 350 could include many other features and functions known in the art that are not shown in FIG. 4.

Figure 5:
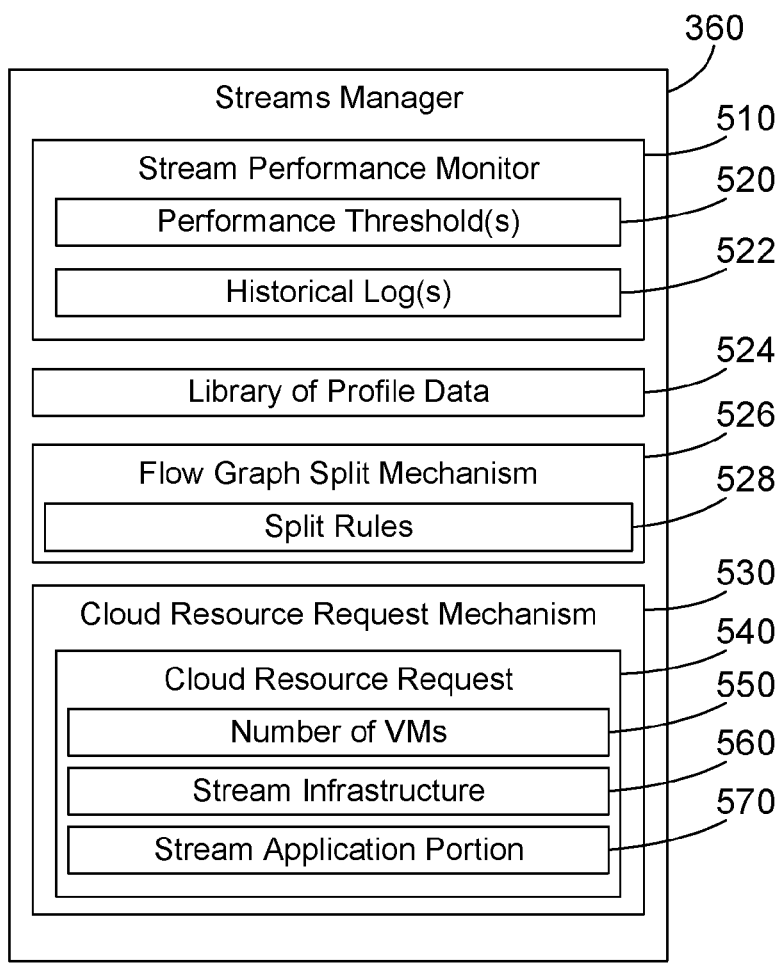
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a performance monitor 510 with one or more performance thresholds 520. Performance thresholds 520 can include static thresholds, such as percentage used of current capacity, and can also include any suitable heuristic for measuring performance of a streaming application as a whole or for measuring performance of one or more operators in a streaming application. Performance thresholds 520 may include different thresholds and metrics at the operator level, at the level of a group of operators, and/or at the level of the overall performance of the streaming application. Performance of a streaming application may also be measured by comparing current performance to past performance in one or more historical logs 522. Note the performance measured can include performance for a single operator, performance for a group of operators, and performance for the streaming application as a whole. The stream performance monitor 510 monitors performance of a streaming application, and when current performance compared to the one or more performance thresholds 520 or compared to the historical log(s) 522 indicates current performance needs to be improved, the streams manager 360 then determines how to split the flow graph and how to deploy a portion of the flow graph to one or more VMs in a cloud. This is done using the flow graph split mechanism 526, which operates according to one or more split rules 528 that are derived from a library of profile data 524. The library of profile data 524 may include profile data from one or more previous executions of one or more streaming applications, which could include (but does not necessarily include) the streaming application being currently executed. The library of profile data is classified according to operator function, which allows the split rules 528 to be generated from the library of profile data 524. The split rules 528 can specify an operator or operator type, along with an indication of whether the operator should be kept with one or more other operators, and/or an indication of whether the operator should be separated from one or more other operators. The flow graph split mechanism 526 determines how to split the flow graph into multiple portions that include one or more portions to be deployed to a virtual machine. Once the portion(s) to be deployed to a virtual machine is determined, the streams manager 360 communicates the need for resources to the cloud resource request mechanism 530. The cloud resource request mechanism 530, in response to the communication from the stream performance monitor, assembles a cloud resource request 540, which can include information such as a number of VMs to provision 550, stream infrastructure needed in each VM 560, and a stream application portion 570 for each VM. Once the cloud resource request 530 is formulated, the streams manager 360 submits the cloud resource request 540 to a cloud manager, such as cloud manager 350 shown in FIGS. 3 and 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, and could specify operator A and operator B at 570. In response, the cloud manager would provision two VMs with the common stream infrastructure, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A, and a second VM with the common stream infrastructure and operator B.

Figure 6:
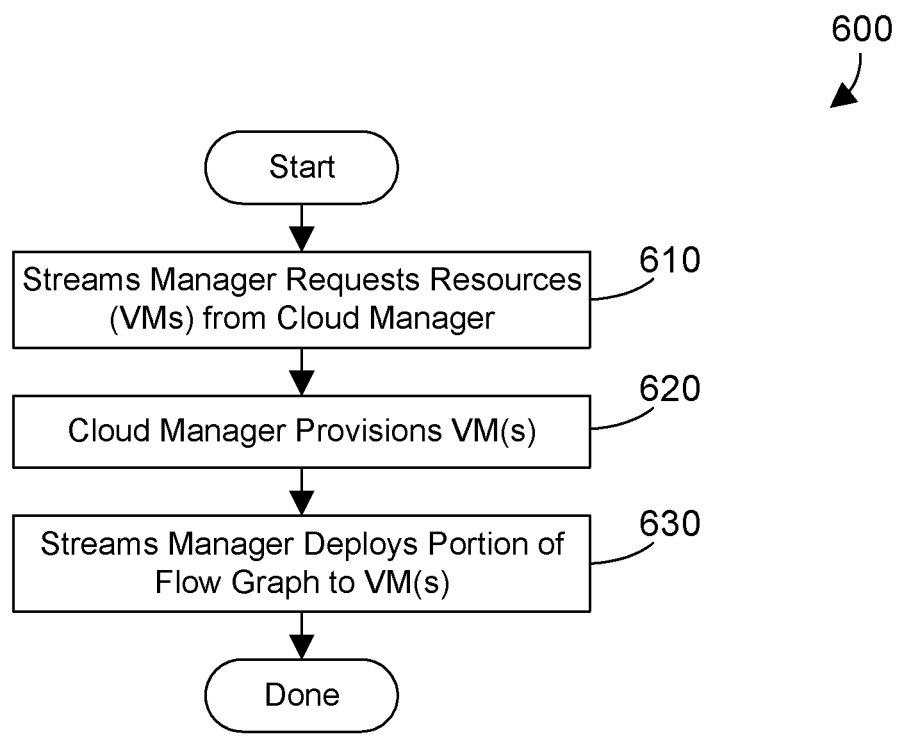
FIG. 6 is a flow diagram of a method for a streams manager to request and receive from a cloud manager virtual machines to improve performance of a streaming application.

Referring to FIG. 6, a method 600 shows one suitable example for enhancing performance of a streaming application, and is preferably performed by the streams manager 360 interacting with the cloud manager 350. The streams manager requests resources, such as VMs, from the cloud manager (step 610). The cloud manager provisions the VMs (step 620). The streams manager then deploys a portion of the flow graph to the VMs (step 630). When the streaming application is not initially hosted in the cloud, the result will be a hybrid implementation of the streams application, with some portions hosted on a dedicated computer system and other portions hosted by one or more VMs in the cloud.

Figure 7:
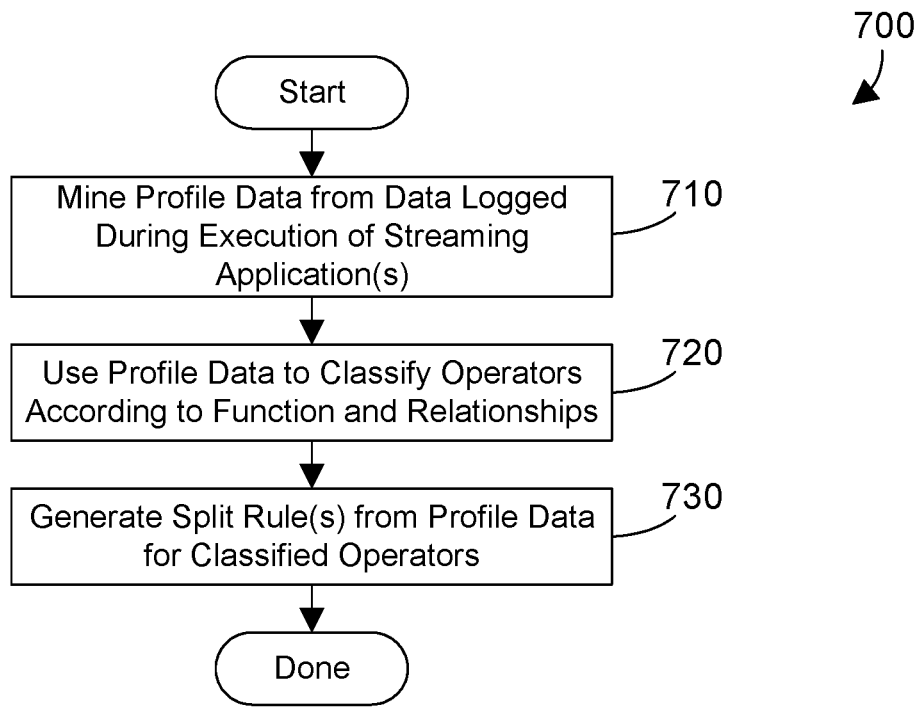
FIG. 7 is a flow diagram of a method for a generating one or more split rules from profile data for streaming operators.

FIG. 7 shows one suitable example of a method 700 for generating one or more split rules for one or more operators from profile data. When a streaming application executes, data is typically logged that indicates performance of the streaming application. The profile data can be mined by interrogating the data that was logged during one or more previous executions of one or more streaming applications (step 710). The profile data is then used to classify operators according to function and relationships (step 720). One or more split rules are then generated from the profile data for the classified operators (step 730). Note the profile data can be data mined from either previous executions of the same streaming application or previous executions of different streaming applications that contain one or more of the same operators or one or more similar operators. The profile data may thus include profile data for operators in the same application and/or operators in a different application. The split rules generated in step 730 allow the streams manager to determine how to split the flow graph into different portions, one or more of which may be deployed to virtual machines in a cloud.

Figure 8:
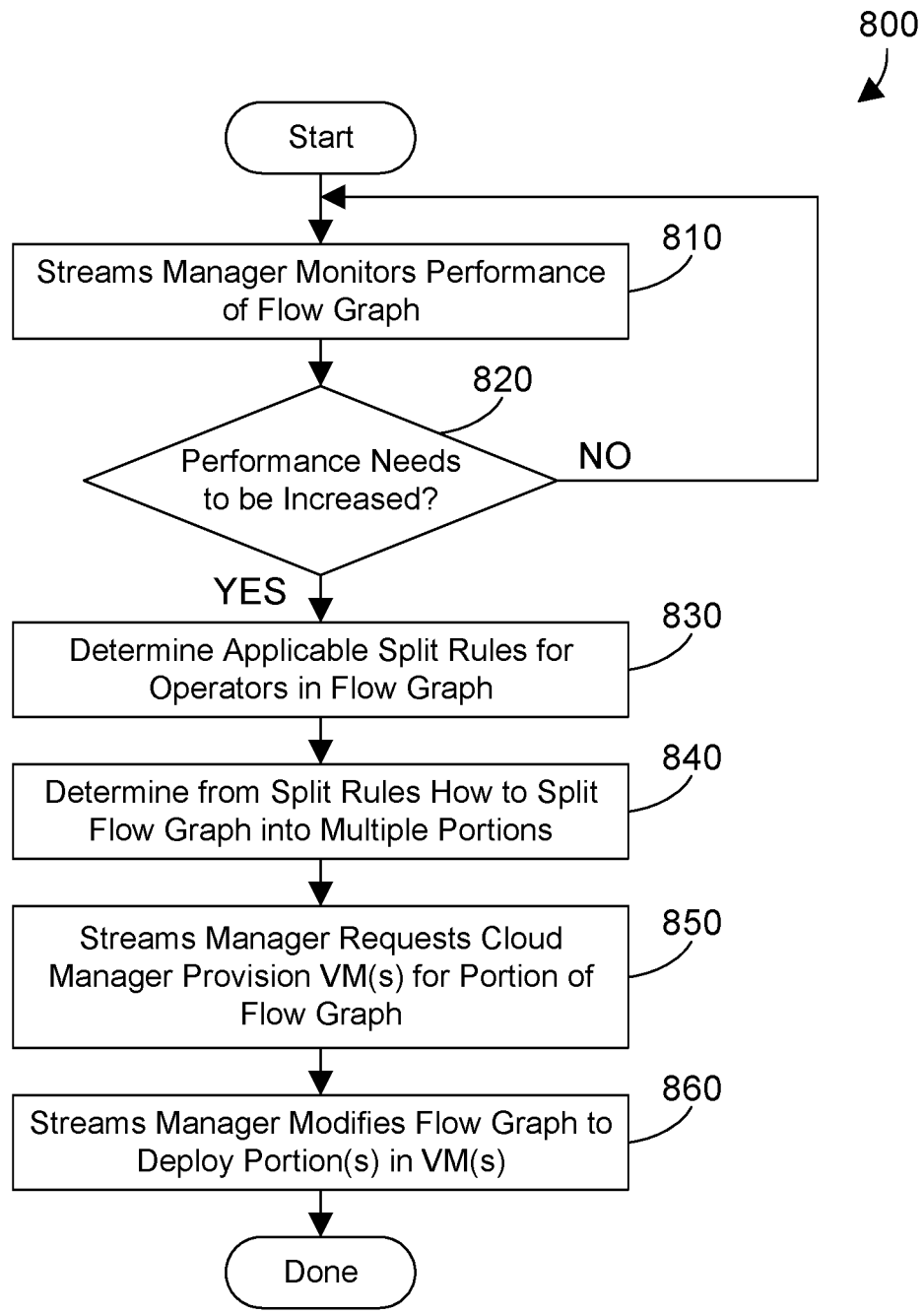
FIG. 8 is a flow diagram of a method for improving performance of a streaming application by deploying one or more portions of a flow graph to VMs according to split rules.

Referring to FIG. 8, a method 800 shows how a streams manage can monitor and improve performance of a streaming application by deploying a portion of the streaming application to one or more VMs in a cloud. The streams manager monitors performance of a flow graph corresponding to a streaming application (step 810). When performance does not need to be increased (step 820=NO), method 800 loops back to step 810 and continues. When performance needs to be increased (step 820=YES), the streams manager determines applicable split rules for operators in the flow graph (step 830). The streams manager determines from the split rules how to split the flow graph into multiple portions (step 840), at least one of which may be deployed to a VM in a cloud. The streams manager then requests the cloud manager provision one or more VMs for a portion of the flow graph (step 850). The streams manager then modifies the flow graph to deploy the portion of the flow graph in the VM(s) (step 860). Method 800 is then done. Method 800 allows a streams manager to make intelligent decisions regarding how to split a flow graph based on profile data gathered in one or more previous executions of one or more streaming applications so one or more of the portions may be deployed to a virtual machine.

Figures 9, 10:
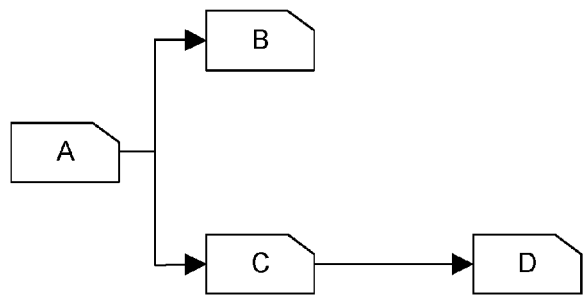
FIG. 9 is a block diagram showing an example of a flow graph for a sample streaming application.
FIG. 10 is a table showing split rules derived from profile data for operators.

FIG. 9 shows a very simple flow graph for the purpose of illustrating the concepts herein. In the flow graph in FIG. 9, operator A performs a split based on some function f(x), and outputs tuples to operator B and operator C. Operator B applies some variance to the input tuples received from operator A, and outputs the tuples. Similarly, operator B applies some variance to the input tuples received from operator A, and outputs the tuples to operator D. Operator D applies a function g(x) to the input tuples, and outputs the tuples.

We assume profile data is mined from one or more previous executions of one or more streaming applications, and classified according to operator function. For this specific example, we assume the profile data includes one or more previous executions of the same streaming application shown in FIG. 9, which provides profile data for the operators A, B, C and D. In an alternative implementation, the profile data could include data from one or more previous executions of different streaming applications that may include one or more of operators A, B, C and D, or may contain none of operators A, B, C and D but contain operators with similar functions. We assume for this example the profile data indicates operator A performs optimally when hosted on the same physical/virtual machine as the receiving operators B and C, and further indicates that distributing operators A, B, and C to different hosts causes an unacceptable latency and suffers a performance hit. A split rule can then be generated based on this profile data that specifies to keep the split operator and receiving operators together, as shown at 1010, 1020 and 1030 in FIG. 10. Note the split rule 1010 could be specific to operators A, B and C, could be general to any split operator that splits according to function f(x) and the corresponding receiving operators, or could be general to any split operator and receiving operators. We further assume the profile data indicates operator D experiences high tuple input rate and low tuple output rate when hosted on the same host as operator C, and that operator D performs optimally when hosted separately from operator C. A split rule can then be generated based on this profile data that specifies to keep the operator that implements g(x) separate from the input operator, as shown at 1040 in FIG. 10. The split rule 1040 could be specific to operators C and D, or could be general to any operator that receives tuples from one operator and implements g(x) in the next operator. The split rules shown in FIG. 10 specify either to keep operators together or to keep operators separate. Application of these split rules is shown in FIGS. 11-13.

The streams manager 360 uses the split rules 1010, 1020, 1030 and 1040 shown in FIG. 10 to determine that operators A, B and C should be kept together, and operator C and D should be separated. Using these split rules, the streams manger could deploy operators A, B and C to a VM, as shown in FIG. 11. Using these same split rules, the streams manager could deploy operator D to a VM, as shown in FIG. 12. Using the same split rules, the streams manager could deploy operators A, B and C to a first VM, and could deploy operator D to a second VM, as shown in FIG. 13. The disclosure and claims herein extends to deploying any suitable portion of a flow graph to one or more virtual machines based on split rules derived from profile data that is relevant to the operators in the streaming application.

Figure 11:
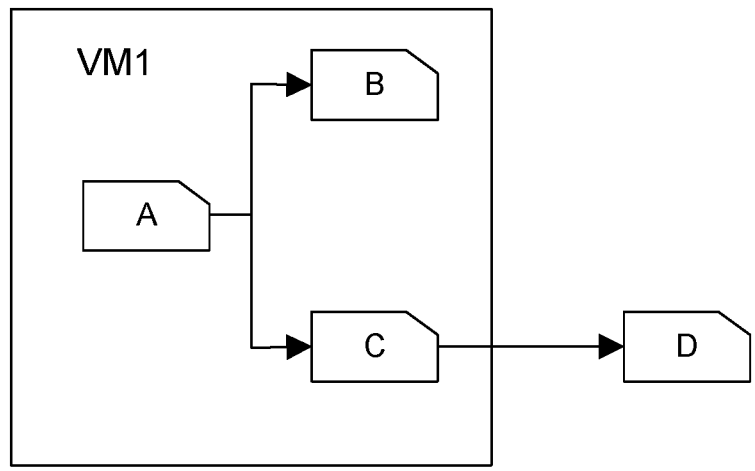
FIG. 11 is a block diagram showing deployment of a first portion of the flow graph in FIG. 9 to a VM.
Figure 12:
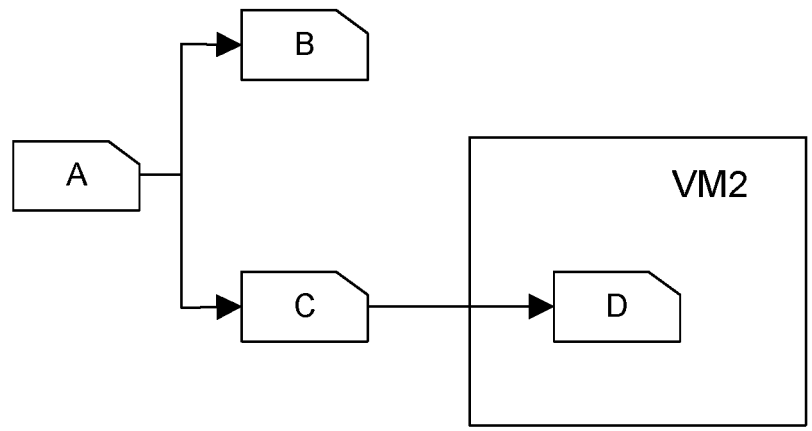
FIG. 12 is a block diagram showing deployment of a second portion of the flow graph in FIG. 9 to a VM.
Figure 13:
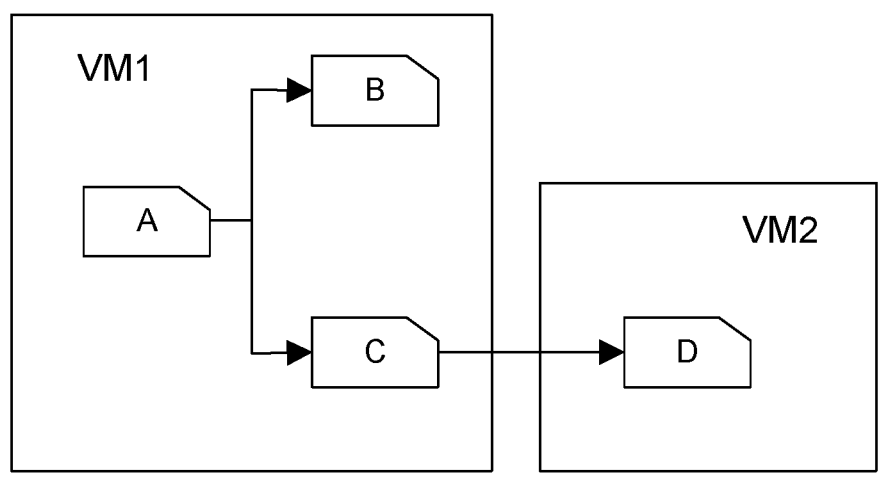
FIG. 13 is a block diagram showing deployment of two different portion of the flow graph in FIG. 9 to two different VMs.

In one specific implementation, the original flow graph shown in FIG. 9 could be implemented on a dedicated computer system, while the portions shown in FMs in FIGS. 11-12 are implemented in VMs in a cloud. With this implementation, the resulting flow graphs shown in FIGS. 11 and 12 will include a hybrid of operators implemented on a dedicated computer system with operators implemented in a cloud. In an alternative implementation, the original flow graph shown in FIG. 9 could also be hosted on one or more VMs in a cloud, and the portions deployed to the cloud could also be hosted in the same or a different cloud. With this implementation, the resulting flow graphs shown in FIGS. 11-13 will include operators that are all implemented in a cloud. Note also that multiple clouds could be used. Thus, the original flow graph shown in FIG. 9 could be implemented in a private cloud, while the portions deployed to VMs shown in FIGS. 11 and 12 could be implemented in a public cloud.

A streams manager monitors performance of a streaming application, and when the performance needs to be improved, the streams manager determines from split rules how to split the flow graph for the streaming application. The streams manager requests virtual machines from a cloud manager. In response, the cloud manager provisions one or more virtual machines in a cloud. The streams manager then modifies the flow graph so a portion of the flow graph is deployed to the one or more virtual machines in the cloud. In this manner a streaming application can dynamically evolve to increase its performance as needed.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   at least one split rule residing in the memory for at least one of the first plurality of streaming operators, wherein the at least one split rule specifies at least one of:
      a plurality of operators to keep together; and
      a plurality of operators to keep apart;
   a first streaming application residing in the memory and executed by the at least one processor, the first streaming application comprising a flow graph that includes a second plurality of operators that process a plurality of data tuples; and
   a streams manager residing in the memory and executed by the at least one processor, the streams manager monitoring performance of the first streaming application, and when performance of the first streaming application needs to be improved, the streams manager determines at least one applicable split rule for the second plurality of operators, determines from the at least one applicable split rule how to split the flow graph of the first streaming application to create a first portion to be deployed to at least one virtual machine, requests a cloud manager to provision the at least one virtual machine, and when the cloud manager provisions the at least one virtual machine, the streams manager modifies the flow graph to deploy the first portion to the at least one virtual machine.

2. The apparatus of claim 1 wherein the first plurality of operators comprises the second plurality of operators.

3. The apparatus of claim 1 wherein the first portion comprises a single operator.

4. The apparatus of claim 1 wherein the first portion comprises a plurality of operators.

5. The apparatus of claim 1 wherein the function of the first plurality of operators comprises at least one of:
  splitting to multiple operators according to a first defined function;
  applying a second defined function; and
  applying a variance to an input.

6. The apparatus of claim 1 wherein the streams manager determines when the performance of the first streaming application needs to be improved by comparing current performance of the first streaming application to at least one performance threshold.

7. The apparatus of claim 1 wherein the streams manager determines when the performance of the first streaming application needs to be improved by comparing current performance of the first streaming application to historical performance of the first streaming application.

8. A computer-implemented method executed by at least one processor for improving performance of a streaming application, the method comprising:
  executing a first plurality of operators in at least one streaming application;
  generating at least one split rule for at least one of the first plurality of streaming operators, wherein the at least one split rule specifies at least one of:
    a plurality of operators to keep together; and
    a plurality of operators to keep apart;
  executing a first streaming application that comprises a flow graph that includes a second plurality of operators that process a plurality of data tuples;
  monitoring performance of the first streaming application;
  when performance of the first streaming application needs to be improved:
    determining at least one applicable split rule for the second plurality of operators;
    determining from the at least one applicable split rule how to split the flow graph of the first streaming application to create a first portion to be deployed to at least one virtual machine;
    requesting a cloud manager to provision at least one virtual machine; and
    modifying the flow graph to deploy the first portion to the at least one virtual machine.

9. The method of claim 8 wherein the first plurality of operators comprises the second plurality of operators.

10. The method of claim 8 wherein the first portion comprises a single operator.

11. The method of claim 8 wherein the first portion comprises a plurality of operators.

12. The method of claim 8 wherein the function of the first plurality of operators comprises at least one of:
  splitting to multiple operators according to a first defined function;
  applying a second defined function; and
  applying a variance to an input.

13. The method of claim 8 wherein performance of the first streaming application needs to be improved is determined by comparing current performance of the first streaming application to at least one performance threshold.

14. The method of claim 8 wherein performance of the first streaming application needs to be improved is determined by comparing current performance of the first streaming application to historical performance of the first streaming application.

15. A computer-implemented method executed by at least one processor for improving performance of a streaming application, the method comprising:
  executing a plurality of operators in at least one streaming application;
  generating at least one split rule for at least one of the plurality of streaming operators, wherein the at least one split rule specifies at least one of:
    a plurality of operators to keep together; and
    a plurality of operators to keep apart;
  executing a first streaming application that comprises a flow graph that includes the plurality of operators that process a plurality of data tuples;
  monitoring performance of the first streaming application;
  when performance of the first streaming application needs to be improved:
    determining at least one applicable split rule for the plurality of operators;
    determining from the at least one applicable split rule how to split the flow graph of the first streaming application to create a first portion to be deployed to at least one virtual machine, wherein the first portion comprises a plurality of operators;
    requesting a cloud manager to provision at least one virtual machine; and
    modifying the flow graph to deploy the first portion to the at least one virtual machine.

16. The method of claim 15 wherein performance of the first streaming application needs to be improved is determined by comparing current performance of the first streaming application to at least one performance threshold.

17. The method of claim 15 wherein performance of the first streaming application needs to be improved is determined by comparing current performance of the first streaming application to historical performance of the first streaming application.

* * * * *